United States Patent [19]

Thomas et al.

[11] 4,071,503

[45] Jan. 31, 1978

[54] POLYCARBODIIMIDE MODIFICATION OF POLYESTERS FOR EXTRUSION APPLICATIONS

[75] Inventors: Norman W. Thomas, Warren; Frank M. Berardinelli, Millington, both of N.J.; Robert Edelman, Staten Island, N.Y.

[73] Assignee: Celanese Corporation, New York, N.Y.

[21] Appl. No.: 715,946

[22] Filed: Aug. 19, 1976

Related U.S. Application Data

[63] Continuation-in-part of Ser. No. 558,982, March 17, 1975, abandoned.

[51] Int. Cl.$^2$ .......................... C08G 63/46; B29C 5/06
[52] U.S. Cl. .......................... 260/75 N; 260/75 NK; 264/98
[58] Field of Search .......... 260/75 NK, 2.5 BF, 75 N, 260/75 NT, 77.5 SS

[56] References Cited

U.S. PATENT DOCUMENTS

| | | | |
|---|---|---|---|
| 3,193,522 | 7/1965 | Neumann et al. | 260/45.9 |
| 3,193,523 | 7/1965 | Neumann et al. | 260/45.9 |
| 3,193,524 | 7/1965 | Holtschmidt et al. | 260/45.9 |
| 3,296,190 | 1/1967 | Reischl et al. | 260/45.9 |
| 3,378,532 | 4/1968 | Fritz et al. | 260/78 |
| 3,575,931 | 4/1971 | Sherman | 260/75 |
| 3,835,098 | 9/1974 | Brown et al. | 260/75 N |

FOREIGN PATENT DOCUMENTS

| | | |
|---|---|---|
| 7,500,044 | 6/1975 | Japan. |
| 1,231,975 | 5/1971 | United Kingdom. |
| 1,330,036 | 9/1973 | United Kingdom. |

OTHER PUBLICATIONS

Neumann et al., Preparation of Carbodiimides from Isocyanates, 1 Angew. Chem. Internat. Edit. 625 (1962).
Chem. Abs. vol. 60, 9456a (1962).
Chem. Abs. vol. 61, 2054f (1964).
Noller, Chemistry of Organic Compounds, (1965), pp. 345–346.

*Primary Examiner*—H.S. Cockeram

[57] ABSTRACT

There is disclosed a process for preparing polycarbodiimide modified thermoplastic polyesters having unique rheological properties which include increased intrinsic viscosity and melt strength. These polycarbodiimide modified thermoplastic polyesters are prepared by reacting the carboxyl end groups of thermoplastic saturated polyesters which are in a molten state with the polycarbodiimide groups of at least one polycarbodiimide such as poly (4,4'-diphenyl-methane carbodiimide) which both (a) is derived from at least one aromatic diisocyanate which is either unsubstituted or contains up to one methyl substituent on each aromatic ring, and (b) contains at least three carbodiimide units per polycarbodiimide molecule.

The resulting polycarbodiimide modified thermoplastic polyester has improved melt strength and intrinsic viscosity and a decreased number of carboxylic acid end groups. These improved melt strength polyesters also have improved die swell and shear sensitivity characteristics and are generally useful in extrusion applications such as blow molding.

14 Claims, No Drawings

POLYCARBODIIMIDE MODIFICATION OF POLYESTERS FOR EXTRUSION APPLICATIONS

RELATED APPLICATION

The present application is a continuation-in-part of copending application, Ser. No. 558,982, filed Mar. 17, 1975, now abandoned.

BACKGROUND OF THE INVENTION

In blow molding processes, molten resins must form into stable parisons for a time long enough to permit a mold to enclose the parison. If these molten polymers do not possess sufficient melt strength or melt viscosity, the extruded tube will tend to elongate or draw under its own weight so that the resulting blow molded article will have non-uniform wall thicknesses, low surface gloss, and poorly defined sample shape.

Polymers such as polyesters, polyamides, polyethers, and polyamines when melted, generally form thin liquids having low melt viscosities. These low melt viscosity materials are unsuited or are only poorly suited for the manufacture of extruded shapes, tubes, deep-drawn articles, and large blow molded articles. In order to overcome this disadvantage and to convert these polymers to a form better suited for the above-mentioned manufacturing techniques, it is known to add compounds to the plastics which will increase their melt viscosities. The materials which are added to increase the melt viscosity of the plastics are generally cross linking agents, as described, for example, in U.S. Pat. No. 3,378,532. Such cross linking agents may be added during the condensation reaction by which the plastics are formed, and/or to the plastics after their formation (prior to, or during their melting). Examples of cross linking agents which may be added to the plastics after their formation and before or after their melting in order to increase the melt viscosity include compounds containing at least two epoxy or isocyanate groups in the molecule, organic phosphorus compounds, peroxides, bishaloalkylaryl compounds, and polyesters of carbonic acid.

these known cross linking agents which are added to increase the melt viscosity of the polymer are not completely satisfactory. They may, for instance, cause an excessively rapid and large increase in viscosity or form reaction products which have an adverse influence on the quality of the plastics. Furthermore, the results obtained with the use of these known cross linking agents are not always uniform or reproducible. For example, when polyesters of carbonic acid are used to increase the melt viscosity, the degree of viscosity increase is generally dependent not only upon the amount of additive used but also upon its molecular weight and on the state of the polycondensation reaction at which the addition takes place.

It has been observed that besides having sufficient melt viscosity or melt strength, polymers which are to be used in blow molding and related applications should also possess s sufficient die swell, i.e., the molten polymer should expand as it is released from the extrusion die. This die swell is important for blow molding applications since (a) the larger the diameter of the extruded polymer, the easier it is for air to be blown into the melt, and (b) the greater the die swell, the greater the expansion of the molten polymer to fit the particular mold.

It has been further observed that polyesters having low intrinsic viscosities are particularly difficult to blow mold and are also unsuited for many other related applications.

It has been still further observed that polymers which are utilized in blow molding applications should also possess a high degree of shear sensitivity, i.e., the molten polymer should thin out and become less viscous upon the application of increasingly higher rates of shear.

A shear sensitive polymer is more easily processed through an extruder and aids in providing an efficient blow molding process. Thus, a polymer having the combination of enhanced intrinsic viscosity and shear sensitivity may be readily extruded (while being subject to a high degree of shear) and thereafter evidence a high degree of stability in the parison as a result of the high intrinsic viscosity and reduced shear present therein.

Thus, although the prior art illustrates the use of numerous additives to modify various properties of polyesters, the search has continued for improved processes for improving certain rheological properties of polyesters, particularly, the intrinsic viscosity and melt strength such that these polyesters may be useful in blow molding and related applications.

Carbodiimide additives have been used to stabilize polyesters (see, e.g., U.S. Pat. Nos. 3,193,522; 3,193,523 and 3,193,524). For example, in U.S. Pat. No. 3,193,522, there is provided a process for stabilizing the polyester compounds against hydrolytic degradation by intermixing therewith polycarbodiimide additives having molecular weights of at least about 500 and having more than three carbodiimide groups in the molecules. Such intermixing is insufficient to provide a reaction of the type discussed herein and therefore incapable of achieving the improved properties obtainable by the practice of the presently claimed invention. Also, U.S. Pat. Nos. 3,193,523 and 3,193,524 discloses the use of monocarbodiimides to stabilize polyesters. However, none of these prior attempts to stabilize polyesters by adding carbodiimide additives have produced polyesters having improved melt strength intrinsic viscosity die swell, and shear sensitivity, characteristics such that they may be capable of use in extrusion and related applications.

Still further, U.S. Pat. No. 2,284,896 discloses a process for reacting inter alia a carbodiimide containing compound with an organic substance having a plurality of groups containing a reactive hydrogen. None of the reactive hydrogen containing compounds, however, are disclosed as being polyesters.

OBJECTS AND SUMMARY OF THE INVENTION

Accordingly, a general object of the present invention is to avoid or substantially alleviate the above problems of the prior art.

A more specific object of the present invention is to provide a process for preparing improved polyester compositions of increased melt strength and intrinsic viscosity.

Another object of the present invention is to provide a process for preparing improved polyester compositions useful in extrusion applications.

A further object of the present invention is to provide a process for preparing polyester compositions having improved die swell and shear sensitivity characteristics.

Still another object of the present invention is to provide the improved polyester compositions prepared by these processes.

It is also an object of the present invention to provide an improved polyester extrusion process utilizing these improved polyesters.

Other objects and advantages of the invention will become apparent from the following summary and description of the preferred embodiments of the present invention.

In one aspect, the present invention provides a process for preparing polycarbodiimide modified thermoplastic polyesters of increased melt strength and intrinsic viscosity. This process comprises incorporating into the structure of a thermoplastic saturated polyester having at least one carboxyl end group, at least one polycarbodiimide which both (a) is derived from at least one aromatic diisocyanate which is either unsubstituted or contains up to one methyl substituent on each aromatic ring, and (b) contains at least three carbodiimide units per polycarbodiimide molecule by reacting the carboxyl end group of the polyester while in the molten state with the carbodiimide group of the polycarbodiimide.

In another aspect, the present invention provides the polycarbodiimide-modified thermoplastic polyester produced by this process.

In still another aspect, there is provided an improved molding process which comprises forming a melt of the above-described polycarbodiimide-modified thermoplastic polyester into a desired article and cooling the molten polycarbodiimide-modified thermoplastic polyester.

The essence of the present invention is the discovery that a limited group of polycarbodiimides will react with the carboxyl end groups of thermoplastic saturated polyesters causing chain branching of the thermoplastic saturated polyesters with the result that the polyester reaction products have increased melt strength and intrinsic viscosity, and a decreased number of carboxylic acid end groups.

The polycarbodiimide modified thermoplastic polyesters prepared according to the process of the present invention also have improved die swell characteristics, i.e., after extrusion of the molten polyesters through an orifice having a particular diameter, the diameter of the extruded polyesters may increase up to about two or three times the diameter of the extrusion orifice, as well as a high degree of shear sensitivity, i.e., the molten polymer becomes less viscous upon the application of increasingly higher rates of shear.

DESCRIPTION OF THE PREFERRED EMBODIMENTS

As indicated hereinabove, the process of the present invention comprises reacting, through a particular mode of reaction, thermoplastic saturated polyesters, while in a molten state, with a polycarbodiimide to form improved polyesters having increased melt strength and intrinsic viscosity.

Any thermoplastic saturated polyester which is capable of being reacted in the molten state may be used in the process of the present invention. The term "saturated polyester" is meant to include all polyesters which do not contain ethylenic unsaturation in the polymer chain. The term "saturated" thus includes saturated aliphatic/aromatic polyesters and wholly aromatic polyesters. Also, these polyesters may be halogenated, i.e., contain halogen (e.g., bromine and/or chlorine) substitution in the polymer chain. The use of halogenated polyesters is particularly desirable when products having decreased flammability are desired.

The term "thermoplastic" polyester is meant to include all polyesters which soften when exposed to sufficient heat and which return to their original condition when cooled to room temperature.

The thermoplastic saturated polyesters useful in the process of the present invention may be formed in a multitude of ways as well known to those skilled in the art.

Typical thermoplastic saturated polyesters employed in the present invention may be prepared from dihydric alcohols and dicarboxylic acids.

Typical dihydric alcohols include aromatic dihydric alcohols such as bisphenol A [i.e., 2,2-bis(4-hydroxyphenyl) propane], phenolphthalein, 4,4'-sulfonyl diphenol, resorcinol, hydroquinone, catechol, naphthalene diols, stilbene bisphenol, 4,4'-diphenylether diphenol, and mixtures thereof and aliphatic dihydric alcohols such as saturated dihydric alcohols having from 2 to 4 carbon atoms and mixtures thereof.

Halogenated dihydric alcohols may also be employed. Such halogenated dihydric alcohols include, for example, tetrabromobisphenol A, tetrachlorobisphenol A, 2,2'-[isopropylidenebis (2,6-dichloro-p-phenylene)], and 2,2-bis[3,5-dibromo-4-(2-hydroxyethoxy)phenyl] propane.

Typical aromatic carboxylic acids include, for example, phthalic acid (including isophthalic and terephthalic), hydroxybenzoic acid, and mixtures thereof.

Typical wholly aromatic thermoplastic polyesters include the reaction product of bisphenol A, isophthalic or terephthalic acids or mixtures (50/50 or 60/40 mole %) of isophthalic and terephthalic acids. Such polyesters may additionally contain minor amounts of a saturated aliphatic dihydric alcohol having from 2 to 4 carbon atoms. Halogenated wholly aromatic thermoplastic polyesters include for example, the reaction product of tetrabromobisphenol A, and a 50-50 mole ratio of isophthalic and terephthalic acid (and optionally, a minor amount of ethylene glycol).

Preferred polyesters include the reaction products of a saturated aliphatic dihydric alcohol having from 2 to 4 carbon atoms and terephthalic acid. Thus, polyethylene terephthalate, polypropylene terephthalate, and polybutylene terephthalate are preferred polyesters in the present invention.

The polycarbodiimides which may used in the present invention are selected from a particularly defined group. Not all polycarbodiimides will increase the intrinsic viscosity and especially the melt strength of polyesters when reacted with the polyester while in the molten state such that the resulting polyester product is not deleteriously influenced by the high reaction temperatures employed and may be useful in extrusion applications. It has been found that only those polycarbodiimides which both (a) are derived from at least one aromatic diisocyanate which is either unsubstituted or contains up to one methyl substituent on each aromatic ring, and (b) contains at least three carbodiimide units per polycarbodiimide molecule will achieve the desired result.

Aromatic diisocyanates which are more heavily substituted result in polycarbodiimides which are not sufficiently reactive to provide the desired rate of reaction with the polyester.

As discussed hereinafter, a low rate of reaction necessarily extends the period of time at which the polyester and polycarbodiimide are maintained at the elevated temperatures employed (e.g., about 200° to 350° C) during the reaction which in turn may lead to polymer degradation.

Polycarbodiimides having less than three carbodiimide units per polycarbodiimide molecule when contacted with the polyester result only in chain extension of the polyester without a significant amount of branching.

Although the increase in melt strength of the modified polyester may attributable, in part, to the increase in intrinsic viscosity of the modified polyester, an additional and proportionally greater improvement in melt strength may be attributed to the chain branching which occurs as a result of the particular reaction herein described. Such chain branching is also responsible to a significant degree for the improvements in die swell and shear sensitivity. Thus, chain branching is necessary in order to obtain improved melt strength, die swell, and shear sensitivity.

The polycarbodiimide should be such that it is miscible with the polyester which is in the molten state. The polycarbodiimides useful in the present invention may have number average molecular weights of generally from about 450 to about 10,000, typically from about 800 to 8,000, and preferably from about 1,000 to about 6,500. Polycarbodiimides having molecular weights greater than about 10,000 may not dissolve in the polyester melt and thus may not be useful in the present invention.

Specific examples of polycarbodiimides which are useful in the present invention include poly(tolyl carbodiimide), poly(4,4'-diphenyl-methane carbodiimide), poly(3,3'-dimethyl-4,4'-biphenylene carbodiimide), poly (p-phenylene carbodiimide), poly (m-phenylene carbodiimide), poly (3,3'-dimethyl-4,4'-diphenylmethane carbodiimide) and mixtures thereof. Preferred polycarbodiimides include poly(tolyl carbodiimide), poly (4,4'-diphenylmethane carbodiimide) and mixtures thereof.

The polycarbodiimides may be formed in any manner known to those skilled in the art, for example, by heating the aromatic diisocyanate compounds defined above in the presence or absence of solvent. The formation of the polycarbodiimide is accompanied by the evolution of carbon dioxide gas and the substantial elimination of any free isocyanate groups.

Although the polycarbodiimides useful in the present invention may be prepared without the use of a catalyst, much higher temperatures (ca. 300° C) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorous containing catalysts described in U.S. Pat. Nos. 2,853,473; 2,663,737; and 3,775,242, and also in Monagle, J. Org. Chem. 27, 3851 (1962). Phospholine oxides such as those described in Campbell et al, J. Amer. Chem. Soc. 84, 3673 (1962) are preferred catalysts. A particularly preferred catalyst is 1-ethyl-3-methyl-3-phospholine-1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate, 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2% by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4- and 2,6- isomers typically contain either 80 parts by weight 2,4-toluene diisocyanate and 20 parts by weight of 2,6-toluene diisocyanate or 65 parts by weight 2,4-toluene diisocyanate and 35 parts by weight 2,6-toluene diisocyanate.

Small amounts (i.e., 50% by weight or less) of aromatic monoisocyanates may also be used in conjunction with the aromatic diisocyanates in the preparation of the polycarbodiimides which are employed in the process of the present invention. These monoisocyanates held control the molecular weight and viscosity of the resulting polycarbodiimides. The amount of aromatic monoisocyanate used depends upon the particular diisocyanate employed, but generally from about 20 to about 50, typically from about 25 to about 45, and preferably from about 30 to about 40% by weight of the monoisocyanate and correspondingly generally from about 50 to about 80, typically from about 55 to about 75, and preferably from about 60 to about 70% by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isocyanate, p-methoxyphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, 2,6-diethylphenyl isocyanate, and mixtures thereof.

Phenyl isocyanate, p-chlorophenyl isocyante, m-chlorophenyl isocyanate and mixtures thereof are preferred monoisocyanates for use in the present invention.

Monoisocyanates alone may not be used to prepare the polycarbodiimides since polymeric carbodiimides would not result from the heating of monoisocyanates alone.

The reaction which takes place between the saturated polyester (e.g., polybutylene terephthalate) and the polycarbodiimide which results in the properties described herein may be summarized by the following:

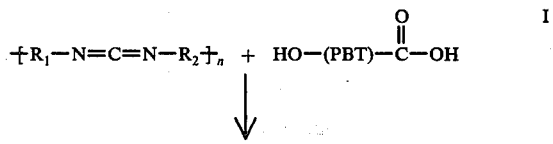

I

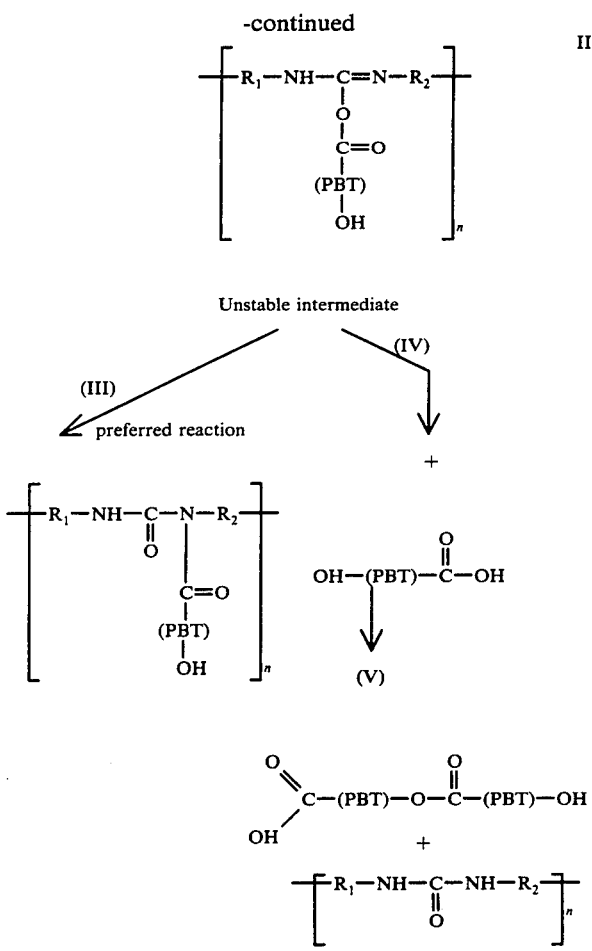

Note: PBT = Polybutyleneterephthalate with hydroxyl and carboxyl end groups removed, and n is at least three.

The above representation is provided to illustrate that the predominant mode of reaction takes place between the carboxyl end group of the polyester and the carbodiimide group (i.e., —N=C=N—) of the polycarbodiimide to form an unstable intermediate. This intermediate subsequently rearranges (see equation III) to form an acylurea, i.e.

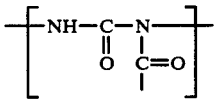

containing structure. The presence of at least three carbodiimide groups on each polycarbodiimide molecule (not illustrated herein for ease of presentation) results in a repetition of the acylurea linkage and accompanying polyester group thereby forming a highly branched backbone structure which is believed to account for the improved above described properties.

The unstable intermediate may possibly also react, to a far lesser degree if at all, with another polyester molecule (see equation IV) in an esterification type of reaction to form a polyester of slightly higher molecular weight and intrinsic viscosity and to convert the original carbodiimide group to a urea group. Although this reaction may possibly account, to some extent, for a slight increase in intrinsic viscosity of the modified polyester product as a whole it does not play a significant role in the observed improvement in melt strength and particularly die swell and shear sensitivity since no chain branching would occur as a result therefrom.

It is possible for the polycarbodiimide to also react with a terminal hydroxyl group of the polyester, although such reaction would proceed at a much slower rate than the illustrated reactions. Accordingly, the extremely rapid rate of the predominate acylurea forming reaction permits the utilization of periods of extremely short duration during which the reaction mixture is maintained at elevated temperatures, and consequently the hydroxyl-based reaction does not have sufficient time to occur to any significant degree and is not responsible for the above described improved properties.

The amount of thermoplastic saturated polyester and of polycarbodiimide employed to obtain the desired product is generally from about 95 to about 99.5 (e.g., 95 to 99%), typically from about 96 to 98.5, and preferably from about 97 to 98.5% by weight thermoplastic saturated polyester and correspondingly generally from about 0.5 to about 5% (e.g., about 1 to about 5%), typically from about 1.5 to about 4%, and preferably from about 1.5 to about 3% by weight of polycarbodiimide. The expressed percentages are by weight of the total reaction mixture (i.e., total weight of polyester and polycarbodiimide).

Amounts of about 0.5 to about 1% by weight of the total reaction mixture will increase the intrinsic viscosity and to a lesser degree the melt strength of the polyester so that the resulting product may not be useful for extrusion applications although it may be employed in certain injection molding applications which utilize materials having an intrinsic viscosity of about 1.0.

Amounts of polycarbodiimide in excess of about 5% by weight of the total reaction mixture may result in polyesters having extremely high viscosity. Amounts of polycarbodiimide below about 0.5% yield negligible improvements in either intrinsic viscosity or melt strength.

Other additives, both polymeric and non-polymeric, such as flame retardants, lubricity agents, dyes, antioxidants, and inorganic fillers (such as glass) may be employed as long as these additives do not interfere with the reaction between the polycarbodiimides and polyesters. Such additives may generally be present in amounts up to about 10% by weight of the total reaction mixture.

The polyester and polycarbodiimide to be reacted may be mixed or blended in any convenient manner as long as the polycarbodiimide is in contact with the polyester while it is in the molten state for a period of time sufficient for the above described chemical reaction to occur. Thus, solid pulverized polycarbodiimide additive may be dry blended with solid polyester chip and then fed to a melt screw extruder (such as a Werner-Pfleiderer ZSK twin screw extruder) which is at a temperature high enough to cause the polyester to melt. The polycarbodiimide dissolves in the polyester melt and thus reaction between the polyester and the polycarbodiimide may take place. Alternatively, the polyester may be milled until fully molten in a plastograph (such as a C. W. Brabender Plasti-Corder) at temperatures high enough to melt the polyester. At that time, the solid polycarbodiimide may be dissolved directly in the molten polyester until a torque level of generally from about 200 to about 1600, typically from about 250 to about 1500, and preferably from about 270 to about 1400 meter-grams is achieved.

By "torque level" is meant the work done in processing materials in a plastograph, such as a C. W. Brabender Rolle Type Plastograph. "Torque level" is measured by a chart recorder in units of meter grams. The magnitude of the torque level depends upon the amount and kind of polycarbodiimide used, the intrinsic viscosity, number of carboxylic acid end groups, and moisture level of the particular polyester employed. A low torque level may be achieved by lowering the intrinsic viscosity, increasing the number of carboxylic acid end groups, and/or increasing the percent moisture content of of the polymer, assuming a fixed amount of polycarbodiimide, a fixed milling time, and a fixed amount of total charge. A low torque level may also be achieved by using smaller amounts of polycarbodiimide. Higher torque levels may be achieved by using larger amounts of polycarbodiimide, or by using higher intrinsic viscosity, lower moisture content, and/or lower amounts of carboxylic acid end groups in the particular polyester.

The present process may be carried out at any temperature which is such that the polyester will remain in the molten state for a period of time sufficient to enable the above described reaction between the polyester and the polycarbodiimide to take place. The reaction temperature should be high enough so that the polyester is in a molten state but not so high as to decompose the polyester or polycarbodiimide. At atmospheric pressure, the reaction may be carried out at temperatures of generally from about 200° to 350°, typically from about 225° to about 290°, and preferably from about 235° to about 265° C.

Although pressures may vary widely, and subatmospheric, atmospheric and superatmospheric pressures may be used, substantially atmospheric pressure is preferred.

The molten polyester and the polycarbodiimide must be in contact at the elevated temperatures employed for a time sufficient for the above described chemical reaction to take place but insufficient to deleteriously influence the resulting product.

Ordinarily the resulting reaction product, which contains acylurea linkages which are unstable at elevated temperatures, evidences a limited stability at the reaction temperatures employed and excessive reaction times would result in significant degradation of product polymer structure. It is therefore a unique characteristic of the present invention that the rapid rate of the above described, acylurea forming reaction, permits the utilization of the relatively high temperatures necessary to achieve the desired reaction while at the same time preserving the polymer integrity of the resulting modified polyester product. The progress of the reaction may be monitored by observing the decrease in carboxylic acid end groups (CEG) with time. When no further decrease in CEG takes place, reaction has ceased. Of course reaction time is a function of temperature, and in the present process, a reaction time of generally from about 1 to about 7, typically from about 1.25 to about 6.8, and preferably from about 1.5 to about 6.5 minutes (melt screw extruder) is usually sufficient to obtain the desired product. Because mixing does not take place to as great a degree in a plastograph as in a melt screw extruder, reaction times in the plastograph are generally somewhat longer and less preferred.

The materials of course may be reacted on a batch, continuous, or semi-continuous basis as desired.

As discussed above, the objects of the present invention are achieved by a specific chemical reaction which occurs between the carboxyl end groups of the polyester and the carbodiimide groups of the polycarbodiimide. This reaction is evidenced by an increase in intrinsic viscosity (IV) melt strength and shear sensitivity as well as a concomitant decrease in CEG level of the resulting modified polyester.

The increase in melt strength and concomitant increase in IV and decrease in CEG result from chain branching of the polyester which chain branching occurs when the polyester and polycarbodiimide are reacted in the manner described.

The increase in shear sensitivity is a further indication that chain branching occurs since chain branching is known to induce a broad molecular weight distribution in the resulting polymer which is generally accompanied by shear sensitive behavior.

As indicated hereinabove, the present process provides polycarbodiimide-modified thermoplastic polyesters having increased melt strength and intrinsic viscosity which polyesters are useful in extrusion applications. Such applications include pipe, film, and blow molding uses such as in blow molding bottles.

Melt strength (MS) may be defined as follows:

$$MS = \frac{T_1}{T_2}$$

wherein $T_1$ equals the time necessary to extrude the first three inches of a six-inch continuous strand of molten polyester, and $T_2$ equals the time necessary to extrude the second three inches of the 6-inch continuous strand. Melt strength may be measured by extruding the 6-inch strand through a constant drive melt index apparatus with a constant drive piston (0.25 inches minute) at a temperature high enough to keep the polyester molten (e.g., about 235° C for polybutylene terephthalate). A melt strength value of from about 1.0 to about 2.0 is desirable when the material is to be used in certain extrusion applications such as blow molding. Ideally, a value of 1.0 is desired since this would mean that the second three-inch portion extruded at the same rate as the first.

For polyesters with a poor or low melt strength, the second segment is extruded much more rapidly than the first segment, resulting in a $T_1/T_2$ ratio significantly greater than 1.0.

Thus, polyesters having poor or very low melt strengths have rather large values of $T_1/T_2$. By saying that certain polyesters have "no melt strength" is meant that the second segment of the six-inch strand is extruded so rapidly that $T_2$ cannot be measured.

The term "high melt strength polyesters" refers to polyesters having a ratio of $T_1/T_2$ approaching the ideal value of 1.0, and the terms "poor" or "low melt strength polyester" refers to polyesters having comparatively large $T_1/T_2$ ratios. Polyesters having "no melt strength" have so small a $T_2$ value that the melt strength cannot be measured.

The improved polyesters of the present invention have melt strengths of generally less than about 2.9 (e.g., 2.0), typically less than about 1.6 and preferably less than about 1.55 at 235° C.

The improved melt strength polyesters of the present invention also have improved die swell characteristics. Die swell may be described as the increase in diameter which takes place when molten polyester is released from an extrusion die. As the polymer moves through the die, the entanglements and cross links of the polymer chains are deformed or displaced from their equilibrium positions. This represents a storage of elastic energy. As the polymer is released from the die, this energy is regained by a return of the entanglements and cross links to their equilibrium positions. This results in die swell.

The diameter of the improved melt strength polyesters of the present invention may increase up to about two or three times the diameter of the extrusion orifice. Die swell is important for blow molding applications since (a) the larger the diameter of the extruded polymer, the easier it is for air to be blown into the melt, and (b) the greater the die swell, the greater the expansion of the polyester to fit the particular mold.

The improved melt strength polyesters of the present invention also have increased intrinsic viscosities. The "intrinsic viscosity" of the polyesters of the present invention may be conveniently determined by the equation $$I.V. = \frac{\lim}{c \to o} \ln \frac{\eta_r}{c}$$

wherein $\eta_r$ is the "relative viscosity" obtained by dividing the viscosity of a dilute solution of the polyester by the viscosity of the solvent employed (measured at the same temperature), and $c$ is the polymer concentration in the solution, expressed in grams/100 ml. The intrinsic viscosity of the improved polyesters of the present invention is generally from about 0.90 to about 2.5 (e.g., 1.1 to about 2.5), typically from about 1.2 to about 2.3, and preferably from about 1.3 to about 2.2.

By "carboxylic acid end groups" is meant the number of carboxylic acid end groups present in the polymer, measured in microequivalents/gram polymer. The number of carboxylic acid end groups may be measured by dissolving the polymer in a 70/30 mixture of o-cresol/chloroform solvent and potentiometrically titrating this solution with tetrabutylammonium hydroxide. The improved polyesters of the present invention may contain generally less than about 10, typically less than about 8, and preferably less than about 6 microequivalents of carboxylic acid end groups per gram of polyester.

The present invention is further illustrated by the following examples. All parts and percentages in the examples as well as in the specification and claims are by weight unless otherwise specified.

EXAMPLE I

This example illustrates the preparation of the polycarbodiimide modified thermoplastic polyesters of the present invention. Runs 1 and 2 illustrate the effect of various concentrations of poly (4,4'-diphenylmethane carbodiimide) on the improved polyesters while run 6 illustrates the effect of utilizing a polycarbodiimide concentration of 0.5%. Runs 1 and 4 illustrate the effect of different polycarbodiimides on the improved polyesters. Runs 2 and 3 illustrate the effect of different extruder residence times on the improved polyesters. Runs 4 and 5 illustrate the effect of different blending techniques on the final improved polyesters.

The details of the reaction for runs 1 through 4 are as follows:

The pulverized, dry polycarbodiimide is blended with about 3 pounds of polybutylene terephthalate pellets. The polybutylene terephthalate pellets have an initial intrinsic viscosity of 0.75 and about 50 to 55 microequivalents of carboxylic acid end groups per gram of polybutylene terephthalate. The melt flow of the unmodified polybutylene terephthalate is too rapid to allow accurate measurement of the initial melt strength. The mixture of polybutylene terephthalate and polycarbodiimide is fed into a Werner-Pfleiderer ZSK twin screw extruder with an intensive mixing screw configuration with kneading blocks.

The melt temperature is approximately 250° C and the reaction is carried out under substantially atmospheric pressure.

Runs 5 and 6 are carried out under the same conditions as runs 1 through 4 except that 50 grams of polybutylene terephthalate are milled in the C. W. Brabender plastograph at 260° and 235° C respectively until fully molten, then the polycarbodiimide is added directly into the melt and the mixture is further milled.

The results of these runs are indicated in Table I below. In Table I, "unmodified" refers to polybutylene terephthalate which is not reacted with polycarbodiimide and "modified" refers to polybutylene terephthalate which is reacted with polycarbodiimide.

TABLE 1

| Run No. | 1 | 2 | 3 | 4 | 5 | 6 |
|---|---|---|---|---|---|---|
| polycarbodiimide | A | A | A | B | B | B |
| derived from | C | C | C | D | D | D |
| amount (% by wt.) | 2 | 3 | 3 | 2 | 2 | .5 |
| blending technique | E | E | E | E | F | F |
| extruder residence time (seconds) | 290 | 380 | 90 | 90 | — | — |
| melt strength | | | | | | |
| unmodified G | — | — | — | — | — | — |
| modified | 1.25 | 1.05 | 1.01 | 1.5 | 1.5 | 2.9 |
| intrinsic viscosity | | | | | | |
| unmodified | 0.84 | 0.84 | 0.84 | 0.75 | 0.81 | .81 |
| modified | 1.76 | 1.96 | 2.03 | 1.4 | 1.3 | .91 |
| carboxylic acid end groups | | | | | | |
| unmodified | 55 | 55 | 55 | 50 | 50 | 50 |
| modified | <2 | <2 | <2 | <2 | <2 | 34 |
| torque | | | | | | |
| unmodified | — | — | — | — | 25 | — |
| modified | — | — | — | — | 500 | — |

A poly(4,4'-diphenylmethane carbodiimide)
B poly(tolyl carbodiimide)
C 4,4'-diphenylmethane diisocyanate
D toluene diisocyanate
E dry blending of solid polyester and polycarbodiimide compound, followed by feeding this mixture into an extruder at elevated temperatures so that the polyester becomes molten and chemical reaction between the polyester and polycarbodiimide takes place.
F admixing polycarbodiimide directly into molten polyester in a plastograph.
G the melt flow is too rapid to allow accurate measurement of the initial melt strength.

COMPARATIVE EXAMPLE I

This example illustrates the effect of blending a monocarbodiimide (run 7) and a highly substituted polycarbodiimide (run 8) with polybutylene terephthalate.

The amounts, reaction conditions, and apparatus are the same as in run 5 of Example I but instead of using one gram of poly (tolyl carbodiimide), there is employed in run 7 one gram of p-chlorodiphenyl carbodiimide (a monocarbodiimide) and in run 8 one gram of poly(2,6-diisopropyl-1,3-phenylene carbodiimide) (a highly substituted polycarbodiimide).

The results of these runs are tabulated below:

TABLE II

| Run No. | 7 | 8 |
|---|---|---|
| carbodiimide | H | I |
| derived from | J | K |
| amount (% by weight) | 2 | 2 |
| melt strength | | |
| unmodified G | — | — |
| modified G | — | — |
| intrinsic viscosity | | |
| unmodified | 0.81 | 0.81 |
| modified | 0.81 | 0.88 |
| carboxyl end group | | |
| unmodified | 50 | 50 |
| modified | 30 | 7 |
| torque | | |
| unmodified | 75 | 40 |
| modified | 75 | 50 |

G the melt flow is too rapid to allow accurate measurement of the melt strength.
H p-chlorodiphenyl carbodiimide
I poly(2,6-diisopropyl-1,3-phenylene carbodiimide)
J p-chlorophenyl isocyanate
K 2,6-diisopropyl-1,3-phenylene diisocyanate.

Thus, the polyesters of the present invention (runs 1 through 5) have higher melt strengths (i.e., lower $T_1/T_2$ ratios) and intrinsic viscosities and lower amounts of carboxylic acid end groups at comparatively similar concentrations of carbodiimide than those polyesters which are modified by monocarbodiimides (run 7) or more highly substituted polycarbodiimides (run 8). As indicated hereinabove, the improved polyesters of the present invention are especially useful for extrusion applications such as pipe, film, and blow molding applications.

EXAMPLE II

This example illustrates the preparation of a polycarbodiimide which is used in the preparation of a polycarbodiimide-modified thermoplastic polyester of the present invention. The particular polycarbodiimide used in the reaction product of an aromatic diisocyanate and an aromatic monoisocyanate.

A 500 milliliter resin reaction flask is fitted with a gas inlet tube, magnetic stirrer bar, and a condenser (graham spiral loop) at the top of which the gas inlet tube leads to a bubbler for observing gas evolution. Toluene diisocyanate (105 grams), p-chlorophenyl isocyanate (62.1 grams) and bis($\beta$-chloroethyl) vinyl phosphonate (13 grams) are added to the flask. The bis($\beta$-chloroethyl)vinyl phosphonate is commercially available from the Stauffer Chemical Co. under the trade name Fyrol Bis Beta and is used as a catalyst in the present reaction.

Argon is passed copiously over the surface of the reactants. The flask containing the reactants is lowered into an oil bath at about 190° C (internal reaction temperature of between about 170° and 180° C). Argon is continuously passed over the reactants at a slow rate while the reaction is taking place.

Within minutes after immersion, bubbles of carbon dioxide may be observed by the clouding of a lime water solution. The reaction is continued for about 4 hours until a foamed material forms in the flask. Heating is continued for an additional period of time until the foam fills most of the flask. Argon is passed rapidly over the surface during this period. Heating is then stopped and the flask is allowed to cool under an argon atmosphere. The reaction vessel containing the product is then weighed and a loss of about 20% is observed. The foamed material is quite friable and is readily chipped out. The remaining deep red material may also be chipped out or removed by softening with acetone. The products shows a small peak in the infra red (IR) for isocyanate (4.4$\mu$), a large peak for carbodiimide (4.7$\mu$), and a substantial peak which is probably polymerized carbodiimide (6.0$\mu$). The carbodiimide and polymerized carbodiimide combined material comprise about 90 to 95% of the product.

This product is further purified by heating under vacuum in an oil bath at 205° C for 2½ hours. Loss in weight is variable with about 15% of the material being removed. The final product shows no isocyanate by IR. Purification also appears to remove virtually all of the catalyst since phosphorus levels are less than 0.1%.

The polycarbodiimide product is reacted with polybutylene terephthalate in a manner similar to that of run 1 of Example I and similar results are achieved.

EXAMPLE III

The polymers formed in runs 1 and 8 (e.g., low I.V. polybutylene terephthalate) of Example I as well as high I.V. (e.g., 1.15) polybutylene terephthalate which is reacted with 2% by weight of the highly substituted and therefore unclaimed polycarbodiimide used in run 8 [poly(2,6-diisopropyl-1,3-phenylene carbodiimide)] are each utilized in the blow molding of a 2.2 inch diameter by 3.3 inch high barrel shape aerosol container.

Blow molding of the modified polybutylene terephthalate compounds is accomplished by charging the polymer to a 2.5 inch multi-station rotary blow molder at 241° C, and processing the polymer under the following conditions:

| | |
|---|---|
| Screw RPM | 45 |
| Back Pressure | 1600 p.s.i. |
| Blow Pressure | 120 p.s.i. |
| Compression Rate | 3.5/1 |

The modified comparatively low I.V. (0.88) polybutylene terephthalate of run 8 cannot be molded in an aerosol container because of the low melt strength of the modified polyester.

The blow molded article formed from the improved polyester produced in run 1 (of Example I) is well-formed, of uniform thickness, has no high gloss and no pitmarks. The blow molded article formed from the comparatively high I.V. (e.g. 1.15) polybutylene terephthalate modified with the polycarbodiimide used in run 8 is also blow moldable; however, the molten resin does not have sufficient melt strength for the parison to hang from the extrusion die long enough so that the injected air can uniformly expand the molten resin. Further, the low shear sensitivity evidenced by the comparatively high I.V. (1.15) modified polyester necessitates adoption of lower extrusion rates than those utilized in blow molding the polymers of run 1. Consequently, the container is poorly formed, and has non-uniform walls. The results using the polycarbodiimide modified polybutylene terephthalate of run 1 and the results using comparatively high I.V. (e.g., 1.15) polybutylene terephthalate modified with poly (2,6-diisopropyl-1,3-phenylene carbodiimide) are summarized in Table III below:

TABLE III

| Property | Melt Strength Increased PBT (Run 1) | Comparative Example PBT (1.15 I.V.) modified by highly substituted polycarbodiimide |
|---|---|---|
| Wall Thickness | uniform | variable |
| Pinch-Off Weld | good | poor |
| Sample Shape | well defined | poorly defined |

TABLE III-continued

| Property | Melt Strength Increased PBT (Run 1) | Comparative Example PBT (1.15 I.V.) modified by highly substituted polycarbodiimide |
|---|---|---|
| Shear Sensitivity | good | poor |

EXAMPLE IV

This example illustrates that the polycarbodiimide reacts predominantly with the carboxyl end groups rather than with the hydroxyl end groups of the polyester.

50 grams of polybutylene terephthalate having an intrinsic viscosity of about 0.75 and a carboxylic end group level (i.e., C.E.G.) of about 50 microequivalents /g of polymer is milled in a plastograph and allowed to react with 1.4 percent by weight of the total reaction mixture of a polycarbodiimide having 4.0 milliequivalents of carbodiimide groups (i.e., —N=C=N) per gram of polycarbodiimide polymer and prepared from toluene diisocyanate. Thus a total of about 2500 carboxyl end group microequivalents are blended with about 2800 carbodiimide microequivalents. Analysis of the final blend of the polybutylene terephthalate and the polycarbodiimide indicates that substantially all of the carboxyl end groups of the polyester are eliminated therefrom (CEG is less than 2) and that a minimal amount of the carbodiimide still remains, as would be expected from the slight excess of carbodiimide microequivalents over the carboxyl end group equivalents added to the blend. The reduction of the carboxyl end group content of the final modified polymer indicates that the carbodiimide groups react preferentially with the acid end groups of the polyester and not with the hydroxyl groups also present thereon.

COMPARATIVE EXAMPLE II

This example illustrates that the mode of reaction between the carbodiimide and the polyester does not proceed by reaction of the hydroxyl group of the polyester with the carbodiimide group of the polycarbodiimide. This is accomplished by allowing an acid and an alcohol to compete for a reaction with the reactive sites of the polycarbodiimide, namely, the carbodiimide groups and comparing the results observed, with the results obtained from a reaction of a polycarbodiimide and an acid alone:

A. REACTION BETWEEN POLYCARBODIIMIDE AND BENZOIC ACID ALONE 25 ml of 0.1N benzoic acid in tetrahydronaphthalene is placed in a 30 ml steel cylinder. The cylinder is capped and then heated to 260° C for one hour (260° C is used to simulate the polyester melt temperature). The boiling point of tetrahydronaphthalene is 207° C and thus a pressurized vessel must be used to obtain the 260° C temperature. A minimum of air is present in the closed cylinder to prevent degradation of the reactants and products. The solution is then cooled and titrated with 0.157N alcoholic sodium methoxide in the presence of a thymol blue indicator. A blank of 15.4 ml of base is determined.

This procedure is repeated with the exception that 0.1171g of a polycarbodiimide derived from toluene diisocyanate is added to the 25 ml of the tetrahydronaphthalene benzoic acid solution and the mixture heated to 260° C for 1 hour. Titration of the cooled solution with 12.4 ml of alcoholic sodium methoxide to the thymol blue end point indicates that 4.0 meq of benzoic acid has been consumed per gram of polycarbodiimide.

B. REACTION BETWEEN POLYCARBODIIMIDE AND MIXTURE OF 2-ETHYLHEXANOL AND BENZOIC ACID

Benzoic acid and 2-ethylhexanol are allowed to react with polycarbodiimide. A 15.7 ml blank is determined in the same manner as above from a 25 ml solution containing equal amounts of 0.1N benzoic acid and 0.1N 2-ethylhexanol in tetrahydronaphthalene.

The above procedure is repeated with the exception that 0.105 grams of the same polycarbodiimide utilized above is added to the tetrahydronaphthalene solution of acid and alcohol and heated to a temperature of 260° C for one hour. Titration of the solution consumed for acid content indicates that 5.1 meq of benzoic acid were consumed per gram of polycarbodiimide.

The results indicate that substantially the same amount of acid is consumed by the polycarbodiimide in the acid-alcohol system as in the acid-alone system. Thus, one may conclude the acid is consumed by the polycarbodiimide even in the presence of an alcohol and that the alcohol does not preferentially react with the polycarbodiimide leaving the original acid unreacted.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A process for preparing a polycarbodiimide modified thermoplastic polyester of increased melt strength and intrinsic viscosity as well as improved die swell and shear sensitivity, which process comprises incorporating into the structure of a thermoplastic saturated polyester, having at least one carboxyl end group, at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule, by reacting the carboxyl end group of the polyester, at a temperature not less than the melting point of the polyester and below the decomposition temperature of the polyester and the polycarbodiimide, with the carbodiimide groups of the polycarbodiimide, wherein the polycarbodiimide modified thermoplastic polyester has a melt strength of less than about 2.0 at 235° C, less than about 10 micro equivalents of carboxyl end groups per gram of polyester, an intrinsic viscosity of about 1.1 to about 2.5, and is useful in extrusion applications.

2. The process of claim 1 wherein there is employed from about 0.5 to about 5% polycarbodiimide and from about 95 to about 99.5% thermoplastic polyester by weight of the total reaction mixture.

3. The process of claim 2 wherein said reaction is carried out at a temperature of from about 200° to about 350° C and at substantially atmospheric pressure.

4. The process of claim 3 wherein said polycarbodiimide may be selected from the group consisting essentially of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof.

5. A process for preparing a polycarbodiimide modified thermoplastic polyester of increased melt strength and intrinsic viscosity as well as improved die swell and shear sensitivity, which process comprises incorporating into the structure of a thermoplastic saturated polyester, having at least one carboxyl end group and which is selected from the group consisting of polyethylene terephthalate, polypropylene terephthalate, and polybutylene terephthalate, at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule, by reacting the carboxyl end groups of said polyester, at a temperature not less than the melting point of the polyester and below the decomposition temperature of the polyester and the polycarbodiimide with the carbodiimide groups of the polycarbodiimide, wherein the polycarbodiimide modified thermoplastic polyester has a melt strength of less than about 2.0 at 235° C, less than about 10 micro equivalents of carboxyl end groups per gram of polyester, an intrinsic viscosity of about 1.1 to about 2.5, and is useful in extrusion applications.

6. The process of claim 5 wherein there is employed from about 1.5 to about 4% polycarbodiimide and from about 96 to about 98.5% thermoplastic polyester by weight of the total reaction mixture, and wherein said reaction is carried out at a temperature of from about 225° to about 290° C and at substantially atmospheric pressure.

7. A process for preparing a polycarbodiimide modified thermoplastic polyester of increased melt strength and intrinsic viscosity as well as improved die swell and shear sensitivity, which process comprises incorporating into the structure of a thermoplastic saturated polyester having at least one carboxyl end group and which is selected from the group consisting of polyethylene terephthalate, polypropylene terephthalate, and polybutylene terephthalate, from about 1.5 to about 3% by total weight of reactants, of at least one polycarbodiimide selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly (m-phenylene carbodiimide), poly(3,3'-dimethyl-4,4'-diphenylmethane carbodiimide) and mixtures thereof by reacting the carboxyl end group of the polyester, at a temperature of from about 235° to about 265° C and at substantially atmospheric pressure, with the carbodiimide groups of the polycarbodiimide, wherein the polycarbodiimide modified thermoplastic polyester has a melt strength of less than about 2.0 at 235° C, less than about 10 micro equivalents of carboxyl end groups per gram of polyester, an intrinsic viscosity of about 1.1 to about 2.5 and is useful in extrusion applications.

8. A polycarbodiimide modified thermoplastic polyester having a melt strength ratio of $T_1/T_2$ of less than about 2 wherein said polycarbodiimide modified thermoplastic polyester comprises the reaction product of (a) a thermoplastic saturated polyester, and (b) a polycarbodiimide which both (1) is derived from at least one aromatic diisocyanate which is either unsubstituted or contains up to one methyl substituent on each aromatic ring, and (2) contains at least three carbodiimide units per polycarbodiimide molecule which polycarbodiimide modified thermoplastic polyester is useful in extrusion applications.

9. The polycarbodiimide modified thermoplastic polyester of claim 8 wherein said polycarbodiimide is selected from the group consisting essentially of poly (tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly (3,3'-dimethyl-4,4'-diphenylmethane carbodiimide), and mixtures thereof.

10. The polycarbodiimide modified thermoplastic polyester of claim 9 wherein said polycarbodiimide modified thermoplastic polyester comprises from about 1 to about 5% polycarbodiimide and from about 95 to about 99% thermoplastic saturated polyester by weight of the total composition.

11. A polycarbodiimide modified thermoplastic polyester having a melt strength ratio of $T_1/T_2$ of less than about 1.6, wherein said polycarbodiimide modified thermoplastic polyester comprises the reaction product of (a) from about 96 to about 98.5% thermoplastic saturated polyester selected from the group consisting essentially of polyethylene terephthalate, polypropylene terephthalate, and polybutylene terephthalate, and from about 1.5 to about 4% by weight of a polycarbodiimide selected from the group consisting of poly(tolyl carbodiimide), poly (4,4'-diphenylmethane carbodiimide), and mixtures thereof which polycarbodiimide modified thermoplastic polyester is useful in extrusion applications.

12. The polycarbodiimide modified thermoplastic polyester of claim 11 wherein said polycarbodiimide modified thermoplastic polyester comprises the reaction product of polybutylene terephthalate and poly (4,4'-diphenylmethane carbodiimide).

13. The polycarbodiimide modified thermoplastic polyester of claim 12 wherein said polycarbodiimide modified thermoplastic polyester comprises from about 1.5 to about 3% polycarbodiimide and from about 97 to about 98.5% thermoplastic saturated polyester by weight of the total composition.

14. An improved molding process which comprises forming the molten polycarbodiimide modified thermoplastic polyester of claim 8 into a desired article and cooling the molten polycarbodiimide modified thermoplastic polyester.

* * * * *